(12) United States Patent
Marcotte et al.

(10) Patent No.: US 10,018,023 B2
(45) Date of Patent: Jul. 10, 2018

(54) METHOD OF MICROBIALLY ASSISTED WATER ALTERNATING GAS INJECTION AS A MEANS OF ENHANCED OIL RECOVERY BY SUPPLEMENTING THE IMMISCIBLE WATER INJECTION CYCLE WITH NUTRIENTS TO IMPROVE OIL RELEASE IN OIL-CONTAINING ROCK FORMATIONS

(71) Applicant: TITAN OIL RECOVERY, INC., Beverly Hills, CA (US)

(72) Inventors: Brian W. G. Marcotte, Rolling Hills, CA (US); Alan James Sheehy, Minyama (AU); Colin Kenneth Hill, San Dimas, CA (US); Michael Thomas Carroll, Glendora, CA (US)

(73) Assignee: Titan Oil Recovery, Inc., Beverly Hills, CA (US)

( * ) Notice: Subject to any disclaimer, the term of this patent is extended or adjusted under 35 U.S.C. 154(b) by 0 days.

(21) Appl. No.: 15/240,757

(22) Filed: Aug. 18, 2016

(65) Prior Publication Data

US 2017/0051595 A1    Feb. 23, 2017

Related U.S. Application Data

(60) Provisional application No. 62/207,470, filed on Aug. 20, 2015.

(51) Int. Cl.
| | |
|---|---|
| *E21B 43/16* | (2006.01) |
| *C09K 8/582* | (2006.01) |
| *E21B 43/20* | (2006.01) |
| *E21B 43/25* | (2006.01) |
| *C09K 8/594* | (2006.01) |

(52) U.S. Cl.
CPC ............ *E21B 43/166* (2013.01); *C09K 8/582* (2013.01); *C09K 8/594* (2013.01); *E21B 43/164* (2013.01); *E21B 43/20* (2013.01); *E21B 43/255* (2013.01)

(58) Field of Classification Search
CPC ................................ E21B 43/16; C09K 8/582
See application file for complete search history.

(56) References Cited

U.S. PATENT DOCUMENTS

| 4,905,761 A | 3/1990 | Bryant |
|---|---|---|
| 4,941,533 A | 7/1990 | Buller et al. |
| (Continued) | | |

FOREIGN PATENT DOCUMENTS

WO    WO2012/164285 A1    12/2012

OTHER PUBLICATIONS

International Searching Authority, "Notification of Transmittal of The International Search Report and The Written Opinion of the International Searching Authority", for PCT/US2016/041712, dated Nov. 4, 2016, 8 pages.

*Primary Examiner* — Catherine Loikith
(74) *Attorney, Agent, or Firm* — Zarley Law Firm, P.L.C.

(57) ABSTRACT

A method for enhancing oil and oil residue recovery from oil-containing rock formations by supplementing a water cycle of a water alternate gas process with nutrients such that the formation resident microorganisms are stimulated as an additional oil release mechanism is provided. The method alters three-phase relative permeability in order to increase displacement efficiency while increasing oil release by microbially assisted water alternate gas processing.

13 Claims, 2 Drawing Sheets

(56) References Cited

U.S. PATENT DOCUMENTS

| | | | |
|---|---|---|---|
| 5,267,615 A * | 12/1993 | Christiansen | E21B 43/16 166/268 |
| 2001/0045279 A1 | 11/2001 | Converse et al. | |
| 2007/0251146 A1* | 11/2007 | Larter | C09K 8/582 48/127.5 |
| 2008/0142230 A1* | 6/2008 | Lau | C09K 8/594 166/401 |
| 2009/0260827 A1* | 10/2009 | Gray | C09K 8/594 166/305.1 |
| 2014/0352946 A1 | 12/2014 | Fallon | |
| 2014/0367087 A1 | 12/2014 | Sheehy et al. | |

* cited by examiner

METHOD OF MICROBIALLY ASSISTED WATER ALTERNATING GAS INJECTION AS A MEANS OF ENHANCED OIL RECOVERY BY SUPPLEMENTING THE IMMISCIBLE WATER INJECTION CYCLE WITH NUTRIENTS TO IMPROVE OIL RELEASE IN OIL-CONTAINING ROCK FORMATIONS

CROSS REFERENCE TO RELATED APPLICATION

This application claims the benefit of U.S. Provisional Application No. 62/207,470 filed Aug. 20, 2015.

BACKGROUND OF THE INVENTION

This invention is directed toward a method of enhancing oil recovery and more particularly enhancing oil recovery by stimulating resident microorganisms through the injection of specific nutrient formulations in combination with a water alternating gas injection process. More specifically, and without limitation, this invention relates to supplementing the immiscible water injection cycle with nutrients during a water alternating gas injection process to improve oil and oil residue release from oil-containing rock formations.

Water Alternating Gas (WAG) is well known in the art and has been applied to improve oil recovery since the late 1950's. The Schlumberger Oilfield Glossary defines "Water Alternating Gas" as "An enhanced oil recovery process whereby water injection is carried out alternately for periods of time to provide better sweep efficiency and reduce gas channeling from injector to producer." This process was originally intended to improve sweep efficiency during gas flooding in an oil-containing reservoir but variations of the WAG technique include injecting gas as a supplement to water injection and vice versa for the purpose of improving sweep efficiency in the oil-containing reservoir.

The WAG technique is not singular, but rather is a combination of two oil recovery processes: gas injection and waterflood. Miscible injections result in homogeneous mixtures while immiscible injections result in heterogeneous mixtures—here, water, gas, and "swollen" oil. Particularly, in the immiscible water injection process, the portion of the injected gas dissolved in the oil reduces the oil viscosity. In addition to reducing viscosity, the dissolved gas also swells the oil, so for a given fixed residual oil saturation, less oil remains after an immiscible waterflood cycle. These two mechanisms have been demonstrated by numerous laboratory PVT and coreflood tests and are well known in the art. The gas injection cycle may be natural gas, carbon dioxide or nitrogen depending on the availability of the gases and the relative economics of the particular application.

As such, the WAG injection process aims to produce more oil out of reservoirs and the effectiveness of WAG is well known in the art. Injection of gas slugs alternated with water slugs is the common practice presently used for controlling gas mobility. This process, however, is not free from deficiencies. It is well known that remaining (residual) oil in flooded rock may be lowest when three phases—oil, water and gas—have been achieved in the rock formation's pore volume.

"Three-phase Relative Permeability" describes the complex relationships of fluid flow in porous media containing the three physical phases of fluids; i.e., oil, gas and water. Three-phase flow is a very complex relationship and has been studied in detail by numerous researchers. A problem with gas injection, both miscible and immiscible, is the inherently unfavorable mobility ratio and the resulting poor volumetric sweep in reservoirs. Here, the three-phase flow relationship may be generally described by the schematic of constant immobile saturations for each fluid phase within the pore space shown in FIG. 1.

Accordingly, a unique and innovative technique in which nutrient materials are supplemented into the injected water during the immiscible water injection cycles of the WAG process in order to recover high percentages of oil and oil residue is needed. Nutrient supplementation uniquely introduces an additional oil release mechanism to farther enhance the WAG process. This process provides an additional dimension to the WAG process by focusing not only on displacement efficiency but also on a unique oil release mechanism. Needed is a process that reduces residual oil saturation through the supplementation of the immiscible water injection cycle in the WAG process to release additional oil and alter the three-phase relative permeability and improve overall oil flow rate and ultimate recovery.

Thus, it is a primary objective of this invention to provide a method of microbially assisted WAG injection as a means of enhanced oil recovery by supplementing the immiscible water injection cycle with nutrients to improve oil and oil residue release in oil-containing rock formations that improves upon the art.

Another objective of the present invention is to provide a method of improving oil recovery in oil containing rock formations.

Yet another objective of the present invention is to provide a method of clearing residual oil from oil-containing rock formations.

Another objective of the present invention is to provide a method of creating an oil swell within the oil-containing rock formations.

These and other objectives, features, and advantages of the invention will become apparent from the specification and claims.

SUMMARY OF THE INVENTION

Figure 1:
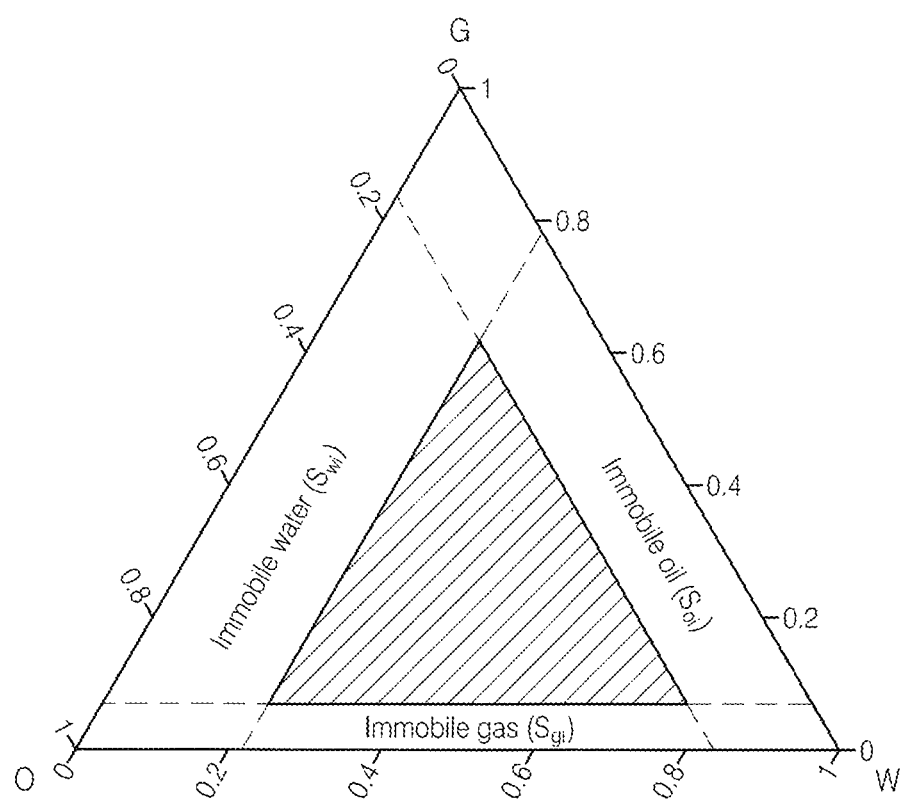
FIG. 1 is a schematic representation of fluid phase saturation of a method of microbially assisted water alternating gas injection as a means of enhanced oil recovery by supplementing the immiscible water injection cycle with nutrients to improve oil release in oil-containing rock formations.
Figure 2:
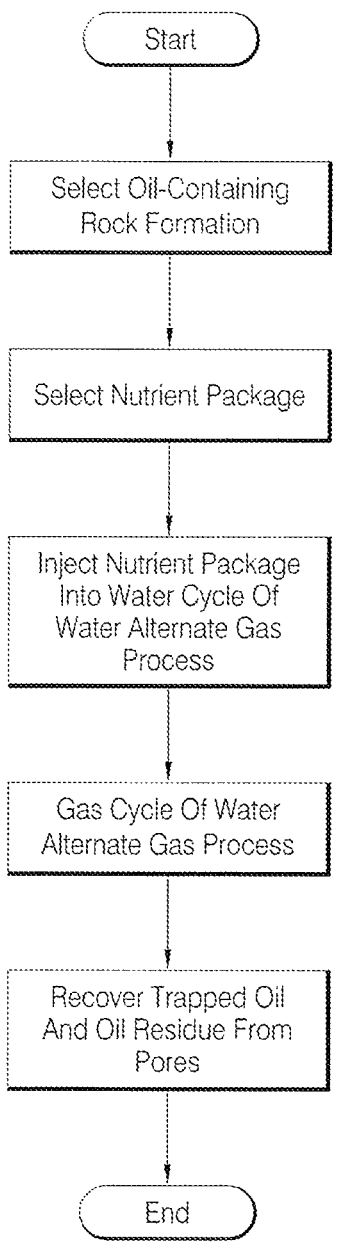
FIG. 2 is a flowchart for a method of microbially assisted water alternating gas injection as a means of enhanced oil recovery by supplementing the immiscible water injection cycle with nutrients to improve oil release in oil-containing rock formations.

In general, the present invention relates to a method for improving oil and oil residue recovery from oil-containing rock formations by supplementing an immiscible water injection cycle of a water alternate gas process with nutrients such that the resident microorganisms are stimulated to increase oil production. The method includes selecting an oil-containing rock formation. Analyses, both enhancement potential and genetic are performed on the resident microorganisms in order to determine a nutrient package. A water alternate gas process is begun for oil recovery such that displacement efficiency and wettability is increased and the particular nutrient package is injected into the immiscible water flow during the waterflood cycle of the water alternate gas process. A period of limitation is allowed to permit changes in the surface active properties of the microorganisms. In addition to favorable interaction between the oil and the stimulated resident microorganisms, the three-phase relative permeability of the oil-containing rock formation pores is altered such that an oil swell created by the nutrient containing waterflood injection alternated with a subsequent gas injection, as required by the water alternate gas process, and clears the trapped oil and oil residue effectively from the formation pores. The recovered oil and oil residue is accumulated for production.

DETAILED DESCRIPTION

Referring to the Figures, a method of enhancing oil recovery through nutrient supplementation described using the following definitions. Disclosed is a method to increase oil recovery from reservoirs of all types including but not limited to: sandstone, 10 carbonates, conglomerate, shale, siltstone or other rock types found to be responsive to water alternating gas injection.

Definitions

"Completions" is the term referencing the final production or injection configuration at the end of a drilling project. When an oil production or water injection well is drilled, progressively smaller steel pipes are installed and cemented to bond between the steel pipe and the drilled rock surface to keep the drilled hole from collapsing and to isolate individual producing rock strata. The process continues from the surface until the total depth of the well has been reached. Depending on the depth of the drilling the steel pipes will be set at various drill depths and may range in size from as much as 30 inches down to 4½ inches or less. The two most common references to "completions" designate: 1) vertical wells and 2) horizontal wells. However, wells can be drilled at any angle between vertical and horizontal at various positions within the overall drilled well-path.

"Permeability" is a property of the rock and not the fluid that flows through it, provided that the fluid 100% saturates the pore space of the rock. This permeability at 100% saturation is called the absolute permeability of the rock. When two fluids such as oil and water occupy the pore space in specific saturation values then the relative permeability to water and oil is:

$$k_{rw} = \frac{q_w u_w L}{A(P_1 - P_2)}$$

where $k_{rw}$=relative permeability to water at a given saturation ($S_w$)
$q_w$=water flow rate
$u_w$=viscosity of water
L=length of a reservoir rock core sample
A=cross sectional area of the core sample
$P_1$=Upstream pressure
$P_2$=Downstream pressure $$K_{ro} = \frac{q_o u_o L}{A(P_1 - P_2)}$$

where $k_{ro}$=relatively permeability to oil at
a given saturation ($S_o$) where ($S_o+S_w$)=100%
$q_{ro}$=oil flow rate
$u_o$=viscosity of oil
L=length of reservoir rock core sample
A=cross sectional area of the core sample
$P_1$=Upstream pressure
$P_2$=Downstream pressure $$K_{rg} = \frac{q_g u_g L}{A(P_1 - P_2)}$$

where $k_{rg}$=relative permeability to gas at
a given gas saturation ($S_g$) where ($S_g+S_o+S_g$)=100%
$q_{rg}$=gas flow rate
$U_g$=viscosity of gas
L=length of reservoir rock core sample
A=cross sectional area of the core sample
$P_1$=Upstream pressure
$P_2$=Downstream pressure
$k_{ro}+k_{rw}+k_{rg}$ is always less than unity.
(Craft and Hawkins, Applied Petroleum Reservoir Engineering, Prentice Hall, 1959).

"Wettability" is described as the adhesion tension, which is a function of the interfacial tension, and determines which fluid (oil or water) will preferentially wet (adhere to) the solid surface of the reservoir rock. If the adhesion tension is large, the denser phase liquid will readily spread out and tend to coat the surface of the reservoir rock. If the adhesion tension is small, the denser fluid will only be weakly attracted to the surface. By changing the reactive character from oil-wet to water-wet, oil will flow more freely rather than being attracted to the rock surface.

Based upon these definitions, a method of increasing and enhancing the number of resident microorganisms is accomplished by applying a specific nutrient formula to stimulate the resident microorganisms to interact with the oil contained in the reservoir rock formation in combination with a water alternating gas process. Resident microorganisms are defined as microorganisms that occur in the commingled natural formation water in the oil reservoir and the injected water targeting additional recovery. The commingled water occupies a part of the reservoir pore space or fracture system(s). A series of analyses that lead to formulation of a specific nutrient package to perform a microbiological response analysis under actual reservoir conditions in combination with the WAG process may be performed. Also, a specific genetic analysis of certain forms of naturally occurring microorganisms to aid in the determination of the presence of oil interactive microorganisms may be performed. Preferably, a specific package of non-glucose nutrients creates specific microbial activity. In one embodiment the nutrient package suppresses some undesirable microorganisms while stimulating desirable microorganisms.

The field specific nutrient materials are then injected into wells drilled into an oil reservoir while applying Water Alternating Gas (WAG) enhanced oil recovery techniques. The injection of the specific nutrient materials enhances the oil releasing qualities of the population of resident microorganisms found in oil reservoirs. In one embodiment, the nutrient package that creates specific microbial activity by applying a controlled concentration (dilution) and a controlled treatment volume and treatment pumping rate based on formation characteristics are used to yield optimum oil recovery. The remaining oil in the producing geologic rock formation is impacted by uniquely supplementing the water injection cycles in the WAG process. No nutrients are added during the gas injection cycles. The delivery of the nutrient package may be prepared in a liquid form to improve the production performance of the WAG process. Also, the delivery of the nutrient package may occur in either a horizontal or a vertical well completion.

Oil-containing rock formations that have a natural tendency to flow fluids through permeability "channels" of proportionately higher relative permeability are targeted. Such channeling reduces the effectiveness of water flooding. The WAG process alternately introduces a cycle of natural gas (or nitrogen) that disrupts the normal flow channels within the rock formation and causes subsequent immiscible water injection cycles to seek new channels allowing the water to contact additional unproduced oil in the rock formation. Stimulated microbes are then able to come into contact with additional oil trapped in the oil-containing rock formation to result in further release oil and oil residue to be moved by subsequent fluid injection cycles.

The stimulation and subsequent enhancement of certain resident microorganisms is to a sufficient level that the surface active properties increase, thereby enhancing oil recovery through related improvements in both wettability and relative permeability to oil within the three fluid phases of the WAG process.

Stimulation of certain resident microorganisms is followed by specific nutrient depletion of the populations accomplished by altering the injection rate including complete cessation of water injection for a relatively brief period of time. The period of deprivation changes the resident microorganisms physiology with respect to size or hydrophobic properties that favor interaction with the oil contained in the oil-containing rock formation ultimately increasing production from the formation. In one embodiment, this increase in microorganisms includes those organisms having surface-active properties. In another embodiment, the cycle of nutrient supplementation and depletion with be repeated multiple times to optimize the oil recovery efficiency.

From the above discussion and accompanying figures and claims it will be appreciated that the method of microbially assisted water alternating gas injection as a means of enhanced oil recovery by supplementing the immiscible water injection cycle with nutrients to improve oil release and recovery offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed:

1. A method for improving oil recovery comprising the steps of:
   selecting an oil-containing rock formation;
   applying a water alternate gas process to the oil-containing formation;
   supplementing a water injection cycle of the water alternate gas process by injecting a nutrient-water mixture that stimulates resident microorganisms;
   releasing oil and oil residue trapped in a pore space through interaction of the oil with the stimulated resident microorganisms and the water alternate gas process such that the oil is freed to accumulate for production; and
   altering a three-phase permeability such that oil recovery is increased.

2. The method of claim 1 wherein injection of the nutrient-water mixture occurs at a controlled volume and rate of injection.

3. The method of claim 1 further comprising a step of allowing a period of nutrient limitation that changes a resident microorganisms physiology with respect to size or surface active properties.

4. The method of claim 1 wherein the nutrient-water mixture is configured to suppress predetermined microorganisms while stimulating other predetermined microorganisms.

5. The method of claim 1 further comprising a step of determining the nutrient-water mixture through a series of analyses under actual reservoir conditions with water alternate gas processing.

6. The method of claim 1 wherein a series of analyses are conducted that lead to the specific nutrient formulation such that the formulation is compatible with water alternate gas processing.

7. The method of claim 1 further comprising a step of conducting a genetic analysis of the resident microorganisms.

8. The method of claim 1 wherein a gas injection cycle of the water alternate gas process comprises natural gas, carbon dioxide, or nitrogen.

9. The method of claim 1 wherein the water injection is an immiscible water injection.

10. The method of claim 1 wherein no nutrients are added during a gas injection cycle.

11. The method of claim 1 wherein wettability increases.

12. A method for improving oil recovery comprising the steps of:
    selecting an oil-containing rock formation;
    applying a water alternate gas process to the oil-containing formation;
    supplementing a water injection cycle of the water alternate gas process by injecting a nutrient-water mixture that stimulates resident microorganisms;
    releasing oil and oil residue trapped in a pore space through interaction of the oil with the stimulated resident microorganisms and the water alternate gas process such that the oil is freed to accumulate for production; and
    wherein relative permeability to oil within three fluid phases increases.

13. The method of claim 12 wherein the oil is not converted to methane prior to being accumulated for production.

* * * * *